US012632056B2

(12) United States Patent
Liberson

(10) Patent No.: US 12,632,056 B2
(45) Date of Patent: May 19, 2026

(54) AIRCRAFT ATTITUDE CONTROLLER AND WING SYSTEM

(71) Applicant: AIRBUS OPERATIONS LIMITED, Bristol (GB)

(72) Inventor: Alexis Anthony Liberson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 307 days.

(21) Appl. No.: 18/454,552

(22) Filed: Aug. 23, 2023

(65) Prior Publication Data

US 2024/0069573 A1      Feb. 29, 2024

(30) Foreign Application Priority Data

Aug. 24, 2022    (GB) ...................................... 2212320

(51) Int. Cl.
G05D 1/00        (2024.01)
B64C 3/38        (2006.01)

(52) U.S. Cl.
CPC ............. G05D 1/0808 (2013.01); B64C 3/38 (2013.01)

(58) Field of Classification Search
None
See application file for complete search history.

(56) References Cited

U.S. PATENT DOCUMENTS 2,454,588 A      11/1948   Baak
5,156,358 A  *   10/1992   Gerhardt ............... B64C 23/072
                                        244/45 R

| | | |
|---|---|---|
| 7,275,722 B2 | 10/2007 | Irving et al. |
| 9,382,000 B1 | 7/2016 | Bowers et al. |
| 12,330,781 B1 * | 6/2025 | Thalheimer ........... B64C 35/008 |
| 12,455,574 B2 * | 10/2025 | Petrov ...................... G05D 1/24 |
| 2008/0308683 A1 | 12/2008 | Sankrithi et al. |
| 2009/0200431 A1 * | 8/2009 | Konings ................. B64C 3/385 |
| | | 244/99.2 |
| 2014/0319267 A1 * | 10/2014 | Paranjape ................. B64C 3/42 |
| | | 244/47 |
| 2016/0009378 A1 | 1/2016 | Guida |
| 2021/0323659 A1 * | 10/2021 | Zhang ...................... B64C 27/26 |
| 2022/0276661 A1 | 9/2022 | Gupta et al. |

FOREIGN PATENT DOCUMENTS

| | | | |
|---|---|---|---|
| EP | 3453609 A1 | 3/2019 | |
| GB | 2454588 A | 5/2009 | |
| GB | 2583499 A  * | 11/2020 | ............... B64C 3/56 |
| WO | 2017118832 A1 | 7/2017 | |

OTHER PUBLICATIONS

Combined Search and Examination Report for GB Application No. 2212320.2 dated Feb. 24, 2023, 6 pages.
EP Search Report for application EP 23193100.7, ten pages, dated Jan. 2, 2024.
Communication pursuant to Article 94(3) EPC for Application EP 23193100.7, seven pages, dated Sep. 18, 2025.

* cited by examiner

*Primary Examiner* — Hunter B Lonsberry
*Assistant Examiner* — Robert L Pinkerton
(74) *Attorney, Agent, or Firm* — Nixon & Vanderhye, PC

(57) ABSTRACT

An aircraft attitude controller configured to obtain information representative of an attitude of an aircraft is disclosed. On the basis of the information, the attitude controller is configured to control the attitude of the aircraft by actively controlling a position of a winglet at a distal end of a wing portion of a wing of the aircraft, relative to the wing portion, thereby to control an angle of incidence of the winglet.

16 Claims, 4 Drawing Sheets

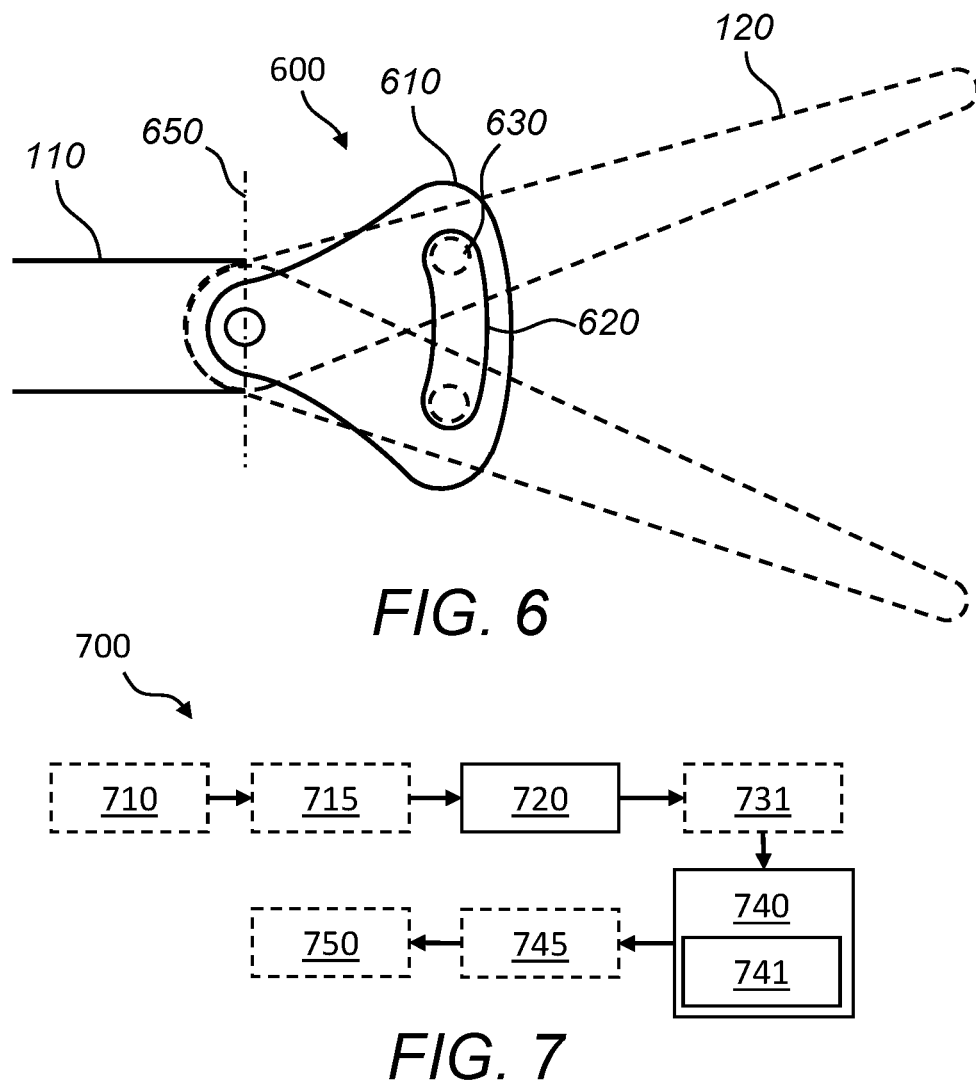
FIG. 6
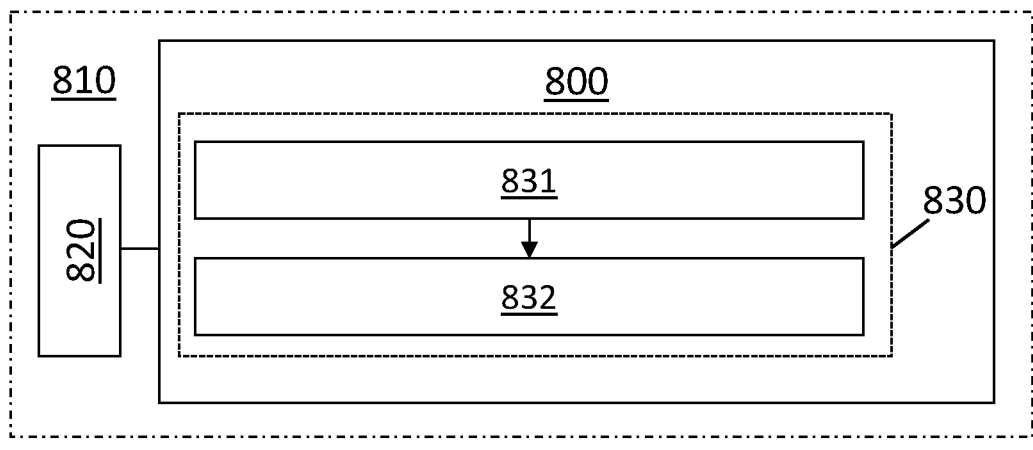
FIG. 7
FIG. 8

AIRCRAFT ATTITUDE CONTROLLER AND WING SYSTEM

CROSS RELATED APPLICATION

This application claims priority to United Kingdom Patent Application GB 2212320.2, filed Aug. 24, 2022, the entire contents of which is hereby incorporated by reference.

TECHNICAL FIELD

The present invention relates to aircraft attitude controllers, wing systems and aircraft comprising such aircraft attitude controllers and wing systems.

BACKGROUND

The mass of an aircraft typically decreases throughout a flight of the aircraft as fuel is consumed to power engines of the aircraft. Such a reduction in mass, particularly during a cruise phase of a flight of the aircraft, may reduce a lift requirement of the aircraft. An attitude, such as a pitch of the aircraft, may therefore change throughout the flight to achieve the amount of lift required.

In addition, fuel tanks are typically distributed throughout an aircraft, such as within wings of the aircraft. Therefore, a distribution of mass in the aircraft may also vary throughout a flight of an aircraft. This may, in turn, affect a centre of gravity of the aircraft. This may similarly cause a change in attitude of the aircraft, as the centre of gravity may move relative to a centre of lift of the aircraft.

In some aircraft, fuel may be used as a ballast to adjust the centre of gravity of the aircraft, thereby to control an attitude of the aircraft. For example, fuel may be passed between tanks that are located fore and aft of the aircraft, such as between a tank located substantially centrally in the aircraft and a tank located towards a tail of the aircraft. This may require the use of pumps, pipes, and other ancillary equipment.

SUMMARY

A first aspect of the present invention provides an aircraft attitude controller configured to: obtain information representative of an attitude of an aircraft; and, on the basis of the information, control the attitude of the aircraft by actively controlling a position of a winglet at a distal end of a wing portion of a wing of the aircraft, relative to the wing portion, thereby to control an angle of incidence of the winglet.

Controlling the attitude of the aircraft may reduce a drag of the aircraft, reduce a fuel consumption of the aircraft, and/or increase an efficiency of the aircraft. This may be particularly advantageous when an attitude of the aircraft changes during a flight, such as due to a changing mass and/or changing distribution of mass of the aircraft. For instance, as fuel is spent during a flight of the aircraft, a mass of the fuel and/or distribution of the fuel in the aircraft may change. This may cause a centre of gravity of the aircraft to change, which may in turn result in a change in the attitude of the aircraft. A change in the attitude of the aircraft may result in an increase in a drag or fuel consumption of the aircraft. Additionally, a reduction in a mass of the aircraft may result in a lower lift requirement of the aircraft, which may in turn result in a change in an attitude of the aircraft to achieve the required lift.

Controlling the position of the winglet to control the angle of incidence of the winglet may change a distribution of lift on the wing, for example to control a centre of lift of the aircraft and thereby control an attitude of the aircraft. In this way, the winglet may be moved to adjust a centre of lift of the aircraft as a centre of gravity of the aircraft and/or as the lift requirements of the aircraft change during a flight. This may allow the aircraft to fly at an attitude that is beneficial, and in particular at an attitude at which a level of drag, such as a lift-induced drag (or "induced drag") and/or a drag associated with a fuselage of the aircraft, is lower than it would otherwise be in the absence of such control. This may also allow an attitude of the aircraft to be adjusted without moving fuel to different tanks in the aircraft, such as without moving fuel back and forth along a longitudinal axis of the aircraft to change the centre of gravity of the aircraft. In particular, there may be no requirement for a fuel ballast system in the aircraft. This may reduce a cost, weight, and/or complexity of the aircraft.

Optionally, the aircraft attitude controller is configured to obtain the information representative of the attitude of the aircraft, and to control the attitude of the aircraft, during a cruise phase of a flight of the aircraft. This may be particularly advantageous as an aircraft typically spends most of a flight in the cruise phase. Reducing drag during the cruise phase may therefore present a significant improvement in fuel consumption. Moreover, a large portion of the fuel of the aircraft is typically consumed during a cruise phase, and so a mass and/or a distribution of mass, and therefore an attitude, of the aircraft may change significantly throughout a cruise phase. In this way, the controller may be configured to control the attitude of the aircraft as the mass and/or distribution of mass changes throughout the cruise phase, in particular by controlling the position of the winglet throughout the cruise phase.

The controlling the position of the winglet may also advantageously change a level of induced drag generated by the wing and/or the wing portion, such as by controlling a distribution of lift over a span of the wing, and/or by controlling a tip vortex generated at the tip of the wing and/or winglet. This may allow the controller to control a level of induced drag during a flight, such as during the cruise phase, for instance to reduce the level of induced drag. Optionally, the controlling the attitude of the aircraft may be to reduce a fuel consumption of the aircraft and may comprise balancing a change in induced drag caused by a change in the position of the winglet with a reduction in other forms of drag, such as fuselage drag, caused by a change in the attitude of the aircraft. Moreover, the attitude of the aircraft may be controlled without operating other control surfaces of the aircraft. This may be beneficial in that operation of other control surfaces may lead to an increase in drag that is greater than would arise from controlling the position of the winglet. Indeed, as noted above, controlling the position of the winglet may even reduce a level of induced drag on the aircraft.

Optionally, the controller may be configured to control the position of the winglet during a take-off and/or a landing procedure, such as to increase or decrease an angle of attack of the winglet relative to a streamwise airflow over the wing. This may change an amount of lift generated by the winglet, such as to increase a lift of the entire wing during the take-off and/or landing procedure. Alternatively, or in addition, controlling the position of the winglet may control, such as reduce or prevent, a separation of airflow over the winglet during the take-off and/or landing procedure. This may, in turn, increase a lift and/or reduce a drag on the aircraft and/or wing system, in use. This may allow the aircraft to take-off and/or land at lower speeds, and as such may also reduce a landing distance of the aircraft. This may allow the aircraft to take off and/or land on shorter runways than it may otherwise be able to.

Optionally, the attitude of the aircraft comprises a pitch of the aircraft and/or an angle of attack of the aircraft. The pitch may be a pitch of a longitudinal axis of the aircraft. As noted above, as fuel is spent during a flight, such as during cruise of the aircraft, a centre of gravity of the aircraft may change. For example, if the aircraft comprises plural fuel tanks, or fuel tank portions, spaced apart longitudinally in the aircraft, such as in a fuselage and/or wing of the aircraft, then fuel may move fore and aft of the aircraft during flight. This may, in turn, cause a centre of gravity of the aircraft to move fore and aft of the aircraft. If the centre of lift of the aircraft remains relatively unchanged, or if it does not change in tandem with the centre of gravity, then the change in the centre of gravity may lead to a change in the pitch of the aircraft. A change in a pitch of the aircraft may cause a greater area of the fuselage to be exposed to a streamwise airflow (relative to the aircraft) over the fuselage, thereby increasing a drag of the fuselage of the aircraft. For instance, if the aircraft is pitched upwards, the streamwise airflow may impinge on a belly of the fuselage, and if the aircraft is pitched downwards, then the streamwise airflow may impinge on a top of the fuselage.

By controlling the position of the winglet, a location of the centre of lift of the wing in a longitudinal direction of the aircraft may be changed, such as to compensate for the change in the centre of gravity of the aircraft and thereby control the attitude, such as the pitch, of the aircraft. This may be to facilitate maintenance of the aircraft at a pitch whereby a longitudinal axis of the aircraft is substantially aligned with a direction of travel of the aircraft, thereby to reduce, or minimise, drag associated with the fuselage of the aircraft.

Optionally, the information comprises information on any one or more of the following properties: a pitch of the aircraft; an angle of attack of the aircraft; a speed of the aircraft; a drag of the aircraft; a mass of the aircraft; a distribution of mass of the aircraft; a centre of gravity of the aircraft; an amount of fuel in the aircraft; a fuel consumption of the aircraft; and an efficiency of the aircraft.

In other words, the controller may control the attitude of the aircraft based on any one or more of the above properties, such as based on an amount of, or distribution of, mass and/or fuel in the aircraft, based on a fuel consumption of the aircraft, and/or based on an efficiency of the aircraft. In this way, the controller may control the attitude of the aircraft to influence or control one or more of the properties listed above. For instance, the controller may be configured to control the attitude of the aircraft to reduce, or minimise, a fuel consumption of the aircraft, and/or to increase an efficiency of the aircraft. Alternatively, the controller may detect a pitch and/or an angle of attack of the aircraft, and control the attitude, such as the pitch of the aircraft, based on the detected pitch and/or angle of attack. A speed of the aircraft may affect a lift generated by wings of the aircraft, which may, in turn, affect an attitude of the aircraft. The controller may control the attitude of the aircraft based on the speed of the aircraft, for instance so that the aircraft can fly at a desired speed for a given attitude, or at a desired attitude for a given speed.

Optionally, the controller is configured to control the attitude of the aircraft so as to bring one or more of the above listed properties towards a respective target value. For instance, the controller may be configured to control the attitude of the aircraft to facilitate maintenance of a target fuel consumption, target efficiency, and/or a target drag of the aircraft.

Optionally, the aircraft attitude controller is configured to determine a target attitude of the aircraft. Optionally, the controlling the attitude of the aircraft comprises controlling the attitude of the aircraft to bring the attitude of the aircraft towards the target attitude of the aircraft.

The target attitude may be an attitude at which the information representative of the attitude of the aircraft, such as any one or more of the above listed properties, reaches, or approaches, a respective target value. Alternatively, or in addition, the target attitude may be predetermined, and/or may be based on a theoretical attitude at which a property (such as fuel consumption, efficiency, and/or drag of the aircraft) is improved or optimised. The target attitude may be determined based on a mass of the aircraft and/or a distribution of mass in the aircraft. For instance, the target attitude may change as a mass, and therefore lift requirement, of the aircraft changes during a flight. A fully-loaded aircraft may, for example, be flown at an increased target pitch in order to generate sufficient lift. As fuel is spent, the lift requirements of the aircraft may reduce, and so the target pitch may be reduced.

A second aspect of the present invention provides a wing system for an aircraft, the wing system comprising at least a wing portion of a wing, a winglet at a distal end of the wing portion, and a controller, wherein a position of the winglet relative to the wing portion is variable to change an angle of incidence of the winglet, and wherein the controller is configured to obtain information representative of an attitude of an aircraft, and, on the basis of the information, to control the attitude of the aircraft by actively controlling the position of the winglet relative to the wing portion.

As with the aircraft attitude controller of the first aspect, by providing a controller configured to control the attitude of the aircraft by controlling the position of the winglet to change the angle of incidence of the winglet, the wing system may improve an efficiency of the aircraft and/or reduce a drag and/or fuel consumption of the aircraft.

The wing portion may comprise an inboard portion of the wing, such as a portion of the wing connected to a fuselage of the aircraft, and/or may comprise an outboard portion of the wing. The wing portion may be orientated at a fixed angle of incidence relative to a longitudinal axis of the aircraft, such as an axis aligned with the fuselage of the aircraft. The wing portion and/or the wing may comprise twist, meaning that an angle of incidence of the wing and/or wing portion may vary along a span of the wing and/or wing portion. The twist of the wing portion may be fixed. By controlling the position of the winglet relative to the wing portion to change the angle of incidence of the winglet, an overall twist of the wing may be adjusted. This may change a distribution of lift over the wing, such as a spanwise and/or a streamwise distribution of lift, which may in turn cause a change in the attitude of the aircraft.

Optionally, the winglet is rotatably movable relative to the wing portion. In this way, the position of the winglet may be an angular position of the winglet relative to the wing portion.

Optionally, the wing tip is rotatably movable about an axis of rotation that is nonorthogonal to a vertical plane that includes a longitudinal axis of the aircraft. In this way, movement of the wing tip about the axis of rotation may vary a cant angle of the winglet relative to a wing plane of the wing portion. The wing plane may be aligned with a horizontal plane that includes the longitudinal axis of the aircraft, or may itself be at an angle to such a horizontal plane. The wing plane may be aligned with a span and/or a chord of the wing portion, such as a chord at a distal end of the wing portion.

The winglet may be rotatable to vary the cant angle of the winglet above and/or below the wing plane. The winglet may be rotatable to vary the cant angle in a range of up to 5 degrees, up to 10 degrees, up to 25 degrees, up to 45 degrees, up to 90 degrees, or greater than 90 degrees at one or both sides of the wing plane. In this way, the winglet may be rotatable to vary the cant angle so that the winglet is substantially perpendicular to the wing plane and/or the horizontal plane. This may represent a "stowed" position of the winglet. This may allow a total wingspan of the wing system and/or an aircraft comprising the wing system to be reduced, such as when the aircraft is performing ground manoeuvres and/or when the aircraft is in proximity to a terminal of an airport, where space may be restricted. Optionally, the winglet is rotatable to vary the cant angle to different extents above and below the wing plane.

Optionally, an axis of rotation of the winglet relative to the wing portion is orientated at a non-zero toe angle to a vertical plane that includes a longitudinal axis of the aircraft. Optionally, the toe angle is up to 5, up to 10, up to 20, up to 30, up to 45, or greater than 45 degrees. For instance, the toe angle may be from 25 degrees to 35 degrees, such as 30 degrees.

By providing the non-zero toe angle, movement of the winglet about the axis of rotation may vary the angle of incidence of the winglet. This may lead to a change in the twist of the wing portion. As discussed above, by changing the angle incidence of the winglet, a centre of lift of the wing portion, or the wing comprising the wing portion, may be moved fore and/or aft of the aircraft, thereby to change a centre of lift of the aircraft. This may allow the attitude of the aircraft to be controlled, such as to reduce a drag of the aircraft and/or improve a fuel efficiency of the aircraft during a flight of the aircraft.

The wing portion may be a wing portion of a swept wing. For instance, the wing portion may be orientated so that a span line of the wing portion is at a sweep angle to a frontal plane that is orthogonal to a longitudinal axis of the aircraft. In that case, the axis of rotation of the winglet may be perpendicular to the span line of the wing portion. This may improve an ease of construction of the winglet and/or a mechanism for controlling the position of the winglet. Moreover, movement of the winglet to increase or decrease an angle of incidence of the winglet may increase or decrease an amount of lift provided by the winglet. This change in lift would act at the end of the wing portion. As such, by providing a swept wing portion, the change in lift may change a longitudinal distribution of lift on the wing. For instance, reducing an amount of lift provided by the winglet at the tip of the wing portion may move a centre of lift provided by the wing portion forward relative to a longitudinal axis of the aircraft.

Optionally, the wing system comprises a restrictor operable to restrict a range of movement of the winglet. Optionally, the controller is configured to selectively engage or disengage the restrictor. In this way, when the restrictor is engaged, the range of movement of the winglet is restricted by the restrictor, and when the restrictor is disengaged, the range of movement of the winglet is not restricted by the restrictor. The controller may be configured to engage the restrictor during a flight of the aircraft, such as to permit the position of the winglet to be varied within a restricted range during the flight. The flight may include a take-off and landing procedure of the aircraft, as well as a cruise phase of the aircraft. By restricting the range of movement of the winglet during the flight, aerodynamic loads on the winglet and/or loads on a mechanism for controlling movement of the winglet, during the flight, may be reduced. This may also prevent the winglet from being inadvertently moved to a position that may be detrimental to a flight of the aircraft, such as preventing movement of the winglet to a stowed position as described above. In such a stowed position, an angle of incidence of the winglet may be significantly reduced compared to an angle of incidence when the winglet is positioned at an extreme of the restricted range of movement provided by the restrictor. This may cause a similarly significant increase in drag on the winglet and/or an undesirable change in the lift distribution over the wing.

The controller may be configured to disengage the restrictor when the aircraft is on the ground, such as when the aircraft is performing ground manoeuvres and/or when the aircraft is in proximity to a terminal of the aircraft. In this way, the winglet may be moved to the stowed position described above when the aircraft is on the ground. In the stowed position, the winglet may be substantially vertical, such that a span of the winglet is substantially parallel to a vertical plane including a longitudinal axis of the aircraft. In this way, a wingspan of the aircraft comprising the wing system, and/or an aspect ratio of the wing of the aircraft, may be reduced when the winglet is stowed. This may allow the aircraft to operate on the ground at airports having reduced manoeuvring space and/or at airports that place upper limits on a wingspan of an aircraft, while allowing a greater wingspan to be employed in flight, such as to reduce a drag of the aircraft, such as an induced drag of the aircraft.

Optionally, the restrictor comprises a body that is fixed to the wing portion and a slot within which a portion of the winglet, such as a protrusion on the winglet, is configured to move. The slot may have a fixed dimension along which the portion of the winglet can move, such as when the position of the winglet is controlled or varied, thereby restricting a range of movement of the winglet. The restrictor may be releasable from the portion of the winglet to disengage the restrictor. This may be by the body being movable relative to the winglet and the wing portion, and/or by the portion of the winglet being movable relative to the body and/or the slot. Alternatively, the restrictor may be configured to restrict a range of movement of the winglet in any other suitable way. Optionally, a level of restriction of movement of the winglet provided by the restrictor is variable. This may be by the slot comprising a variable dimension along which the portion of the winglet is movable. It will be understood that the level of restriction provided by the restrictor may be varied in any other suitable way.

Optionally, the winglet is movable to an extended position, in which a proximal end of the winglet is substantially aligned with a distal end of the wing portion. Optionally, in the extended position, an upper surface of the winglet is substantially aligned with an upper surface of the wing portion. In this way, an upper and/or a lower surface of the winglet may form a smooth aerodynamic transition between a respective upper and/or lower surface of the wing portion in the extended position.

Optionally, a span of the winglet, when the winglet is in the extended position, constitutes from 10% to 50% of the total span of the wing comprising the wing portion. Optionally, the span of the winglet, when the winglet is in the extended position, constitutes up to 15%, up to 20%, up to 25%, or from 25% to 50% of the total span of the wing comprising the wing portion. Increasing a proportion of the span of the wing that is formed by the winglet may increase an authority of the winglet over a distribution of lift on the wing. For example, moving a larger winglet may increase a level of twist of the wing to a greater extent than correspondingly moving a smaller winglet would. Moreover, a change in a lift generated by a larger winglet, caused by movement of the winglet, may be greater than a change in lift caused by corresponding movement of a smaller winglet. Thus, particularly when the wing portion is a swept wing portion, such as a wing portion of a swept wing, movement of a larger winglet may cause a greater variation in a longitudinal position of a centre of lift of the aircraft than corresponding movement of a smaller winglet would.

Optionally, the wing system comprises an actuator for varying the position of the winglet relative to the wing portion. In this way, the controller may be configured to control the position of the winglet by causing operation of the actuator. In this way, the controller may actively control the position of the winglet using the actuator, such as to actively position the winglet in any position within a range of movement of the winglet. This may improve a versatility of the wing system and/or may improve an authority of the wing system over an attitude of the aircraft, such as to allow more precise control of the attitude of the aircraft.

The actuator may comprise a hydraulic actuator. Alternatively, or in addition, the actuator may comprise an electric or electromechanical actuator, such as an electric motor and/or an electrically operated piston. Providing an electric or electromechanical actuator may reduce a weight of the aircraft wing system, such as by not requiring pipework and/or hydraulic fluid.

Optionally, the controller is the aircraft attitude controller of the first aspect. The controller of the wing system may comprise any of the optional features of the aircraft attitude controller of the first aspect.

A third aspect of the present invention provides a method of controlling an attitude of an aircraft, the method comprising: obtaining information representative of the attitude of the aircraft; and, on the basis of the information, controlling the attitude of the aircraft by controlling a position of a winglet at a distal end of a wing portion of a wing of the aircraft, relative to the wing portion, thereby to control an angle of incidence of the winglet.

As with the aircraft attitude controller of the first aspect and the wing system of the second aspect, by controlling the attitude of the aircraft by controlling the position of the winglet to change the angle of incidence of the winglet, the method may improve an efficiency of the aircraft and/or reduce a drag and/or fuel consumption of the aircraft.

Optionally, the method comprises determining a target attitude of the aircraft, wherein the controlling the attitude of the aircraft comprises controlling the attitude of the aircraft to bring the attitude of the aircraft towards the target attitude of the aircraft.

The method may comprise any of the optional actions performed by the aircraft attitude controller of the first aspect or the controller of the wing system of the second aspect. As such, the method may comprise any of the optional features ascribed to the aircraft attitude controller of the first aspect or the controller of the wing system of the second aspect.

It will be appreciated that the controlling the position of the winglet may comprise controlling the position of the winglet of the wing system of the second aspect of the present invention. As such, the winglet and/or the wing system may comprise any of the optional features of the wing system of the second aspect.

A fourth aspect of the present invention provides a non-transitory computer-readable storage medium storing instructions that, when executed by a processor, cause the processor to perform the method of the third aspect of the present invention. The processor may be a processor of the aircraft attitude controller of the first aspect or a processor of the controller of the wing system of the second aspect, for example. The aircraft attitude controller of the first aspect and/or the wing system of the second aspect may comprise the non-transitory computer-readable storage medium.

A fifth aspect of the present invention provides an aircraft comprising the controller of the first aspect, the wing system of the second aspect, and/or the non-transitory computer-readable storage medium of the fourth aspect. The aircraft may benefit from any of the optional features and/or advantages ascribed to the aircraft attitude controller of the first aspect, the wing system of the second aspect, the method of the third aspect and/or the non-transitory computer-readable storage medium of the fourth aspect.

BRIEF DESCRIPTION OF THE DRAWINGS

Embodiments of the invention will now be described, by way of example only, with reference to the accompanying drawings, in which:

FIG. 6 shows a schematic view towards the leading edge of the winglet, showing a restrictor of the wing system;

FIG. 7 shows a flow chart of a method of controlling an attitude of the aircraft of FIG. 1; and FIG. 8 shows a non-transitory computer-readable storage medium according to an example.

DETAILED DESCRIPTION

Figure 1A:
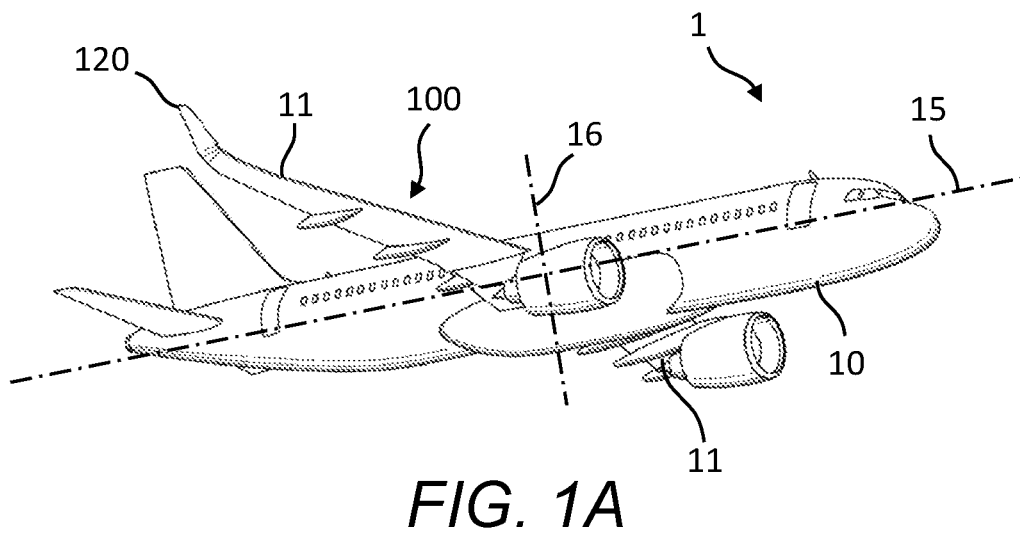
FIGS. 1A and 1B show respective isometric and top-down schematic views of an aircraft.
Figure 1B:
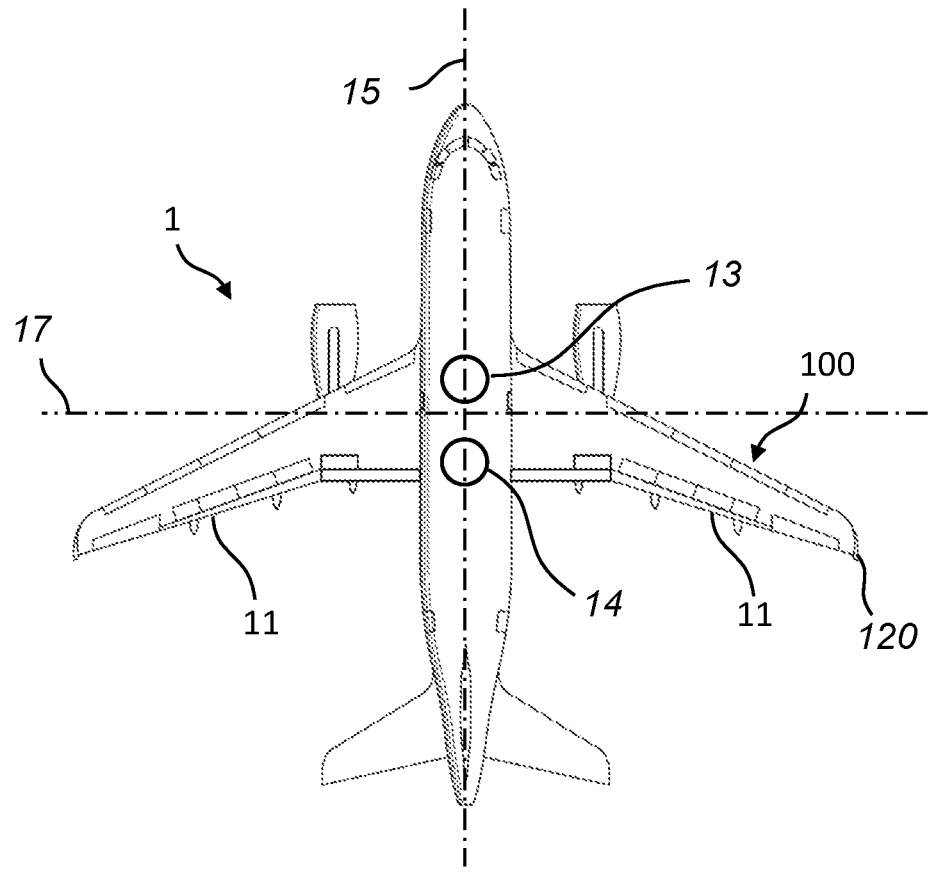

FIG. 1A shows an isometric view of an example aircraft 1 comprising a fuselage 10 and a pair of wings (herein referred to singly or jointly with the reference numeral 11). The fuselage 10 extends generally along a longitudinal axis 15 of the aircraft 1. Here, the longitudinal axis 15 is a direction of minimum aerodynamic drag of the fuselage 10. In other examples, the longitudinal axis 15 is a geometric centreline through the fuselage, which may be different to the direction of minimum aerodynamic drag. FIG. 1B shows a top-down schematic view along a vertical axis 16 of the aircraft 1. The wings 11 each extend in a direction oblique to a horizontal axis 17 of the aircraft 1. In other words, the wings 11 are swept wings 11, which are here swept at an angle of 30° from the horizontal axis 17, but may be swept at any other suitable angle. It will be appreciated that other example aircraft 1 may comprise unswept wings, which extend substantially parallel to the horizontal axis 17.

The aircraft 1 also comprises a wing system 100. The wing system 100, as better shown in FIG. 2, comprises a wing portion 110 of a wing 11 of the aircraft 1 and a winglet 120 at a distal end 112 of the wing portion 110. While the present wing system 100 is described in relation to a wing portion 110 of a single wing 11 of the aircraft 1, it will be understood that the wing portion 110 may be a wing portion 110 of either wing 11 of the aircraft 1. In other examples, an entire wing 11 may be considered the wing portion 110.

The winglet 120 is movable relative to the wing portion 110. Specifically, the winglet 120 is rotatably connected to the wing portion 110, so that the winglet is rotatably movable relative to the wing portion 110. An axis of rotation 123 of the winglet 120 relative to the wing portion 110 is oriented at a non-zero toe angle n to a vertical plane that includes the longitudinal axis 15 of the aircraft 1. In the present example, a sweep angle of the wing 11 and/or the wing portion 110 relative to a frontal plane that is orthogonal to the longitudinal axis 15 is 30°, and the axis of rotation 123 is perpendicular to a span line 113 of the wing portion 110. The span line 113 is here parallel to a leading edge 114 of the wing portion 110. As such, the axis of rotation 123 is orientated a toe angle of 30°. In other examples, the wing sweep and/or the toe angle may be any other suitable value. For instance, the axis of rotation 123 may be non-perpendicular to the span line 113. In other examples, the span line 113 is any other suitable dimension of a wingspan of the wing portion 110. In some such examples, the axis of rotation 123 is perpendicular to the leading edge 114 of the wing portion 110, but this need not be the case.

A position of the winglet 120 is thereby variable, relative to the wing portion 110, by rotating the winglet 120 around the axis of rotation 123. Movement of the winglet 120 about the axis of rotation 123 causes a cant angle $\alpha$ of the wing relative to a wing plane 114 of the wing portion 110 to be varied. The wing plane 114 in the present example comprises a span and a chord of the wing portion 110, and in particular a chord at the distal end 12 of the wing portion 110. In other examples, the wing plane 114 may comprise an average chord of the wing portion 110. Alternatively, the wing plane 114 may be defined in any other suitable way. In some examples, the cant angle $\alpha$ is defined relative to a horizontal plane that is orthogonal to the vertical axis 16 of the aircraft 1. In some examples, the wing plane 114 is substantially aligned with the horizontal plane.

Figures 2, 3A, 3B:
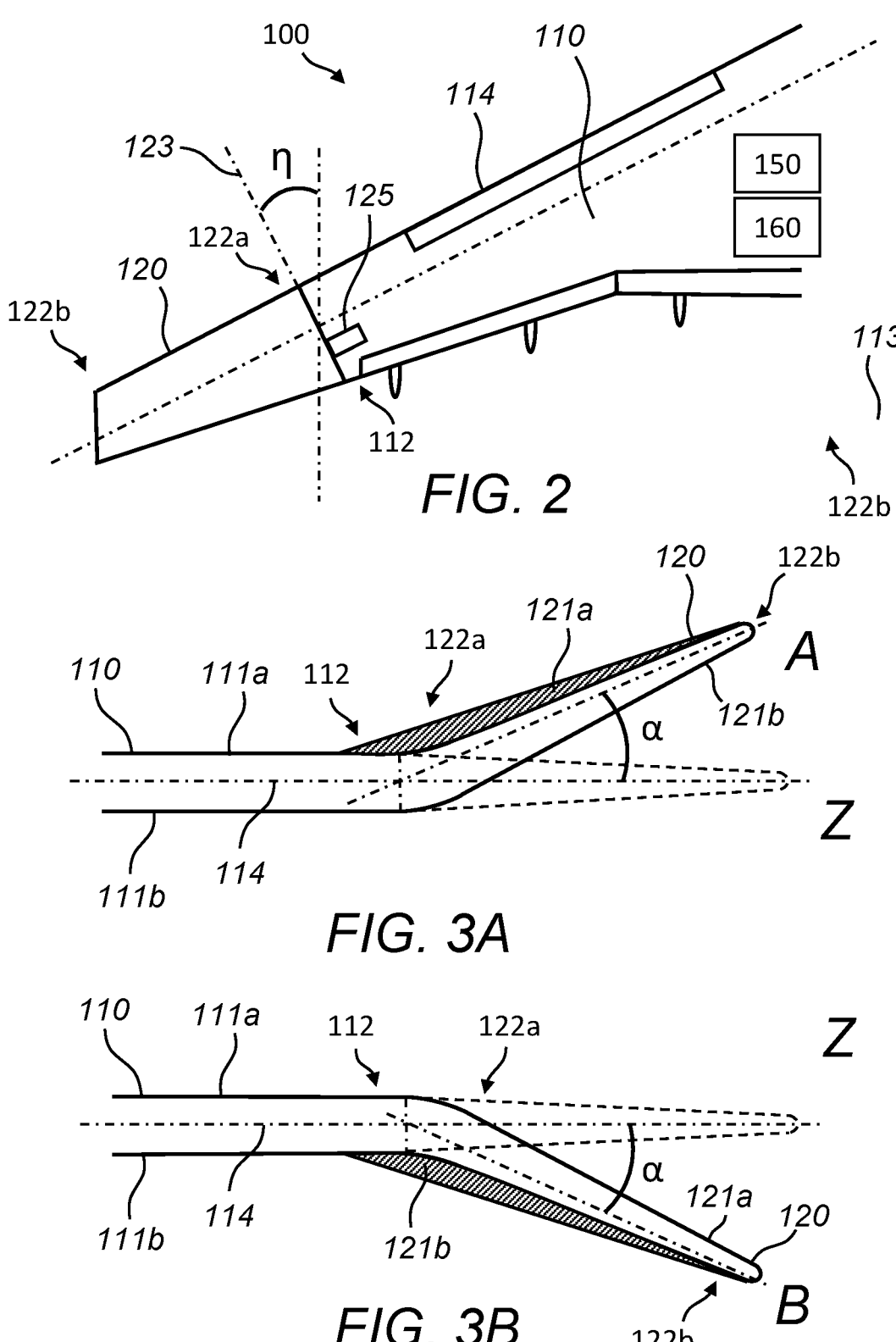
FIG. 2 shows a top-down schematic view of a wing system of the aircraft of FIG. 1.
FIGS. 3A and 3B show schematic views towards a leading edge of a winglet of the wing system of FIG. 2, illustrating a deflection of a winglet.

FIGS. 3A and 3B show an example of the winglet 120 at different positions relative to the wing portion 110. In particular, the winglet 120 shown using dashed lines in each of FIGS. 3A and 3B is in an extended position, labelled "Z", in which a proximal end 122a of the winglet 120, i.e., an end of the winglet 120 closest to the fuselage 10, is aligned with the distal end 112 of the wing portion 110, i.e., an end of the wing portion 110 farthest away from the fuselage 10. This represents a cant angle $\alpha$ of zero. In the extended position, upper and lower surfaces 121a, 121b of the winglet form a smooth aerodynamic transition with respective upper and lower surfaces 111a, 111b of the wing portion. That is, in the extended position Z, the upper surface 121a of the winglet 120 is substantially aligned with the upper surface 111a of the wing portion 110, and the lower surface 121b of the winglet 120 is substantially aligned with the lower surface 111b of the wing portion 110. In the present example, a distance between the upper and lower surfaces 121a, 121b of the winglet 120, such as an average distance along a chord of the winglet 120, decreases from the proximal end 122a to a distal end 122b of the winglet 120. In other examples, this may not be the case. For instance, the average distance between the upper and lower surfaces 121a, 121b of the winglet 120 may be substantially constant from the proximal end 122a to the distal end 122b of the winglet 120.

Figures 4, 5:
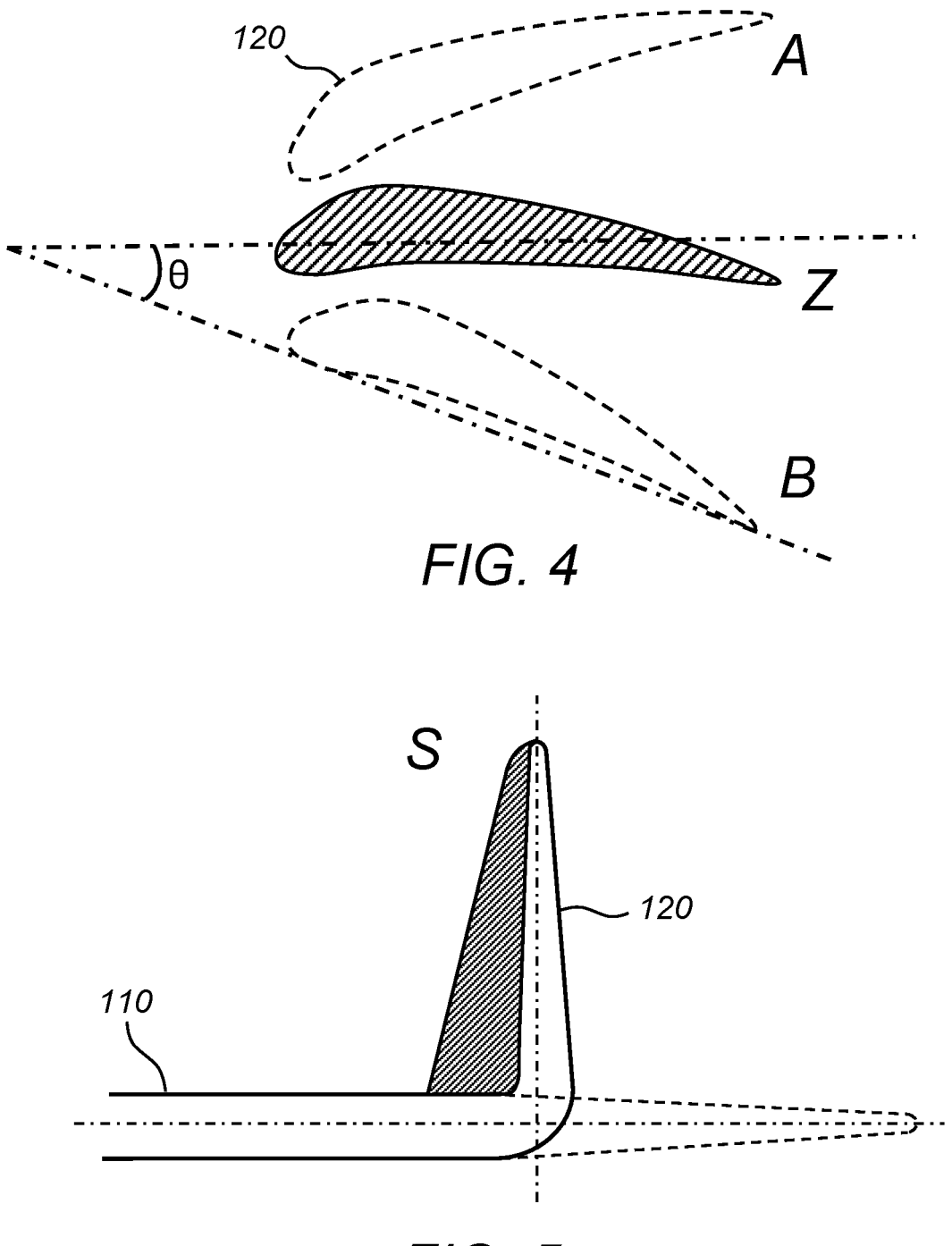
FIG. 4 shows an end-on schematic view along a span of the winglet at the deflections shown in FIGS. 3A and 3B.
FIG. 5 shows a schematic view towards the leading edge of the winglet, illustrating the winglet in a stowed position.

The winglet 120 shown using solid lines in FIG. 3A is in an upwardly deflected position, labelled position "A", so that the winglet extends above the wing plane 114. That is, in the first deflected position, the winglet 120 is positioned so as to have a positive cant angle $\alpha$. The winglet 120 shown using solid lines in FIG. 3B is in a downwardly deflected position, labelled position "B", so that the winglet extends below the wing plane 114. Because the axis of rotation 123 of the winglet 120 is at a non-zero toe angle $\eta$, deflection of the winglet 120 causes a change in an angle of incidence $\theta$ of the winglet 120. This is best seen in FIG. 4, which shows a schematic end-on view of the winglet 120 along a span of the winglet 120. Specifically, deflection of the winglet 120 upwardly, such as towards position A, causes a reduction in an angle of incidence $\theta$ of the winglet 120. Deflection of the winglet 120 downwardly, such as towards position B, causes an increase in the angle of incidence $\theta$ of the winglet 120. The angle of incidence $\theta$ of the winglet 120 is here defined as an angle of a chord of the winglet 120, such as a chord at the proximal end 122a or the distal end 122b of the winglet 120, or an average chord along a span of the winglet 120, to the longitudinal axis 15 of the aircraft 1. However, it will be appreciated that the angle of incidence $\theta$ may be defined in any other suitable way as will be evident to the skilled person. For instance, the angle of incidence $\theta$ of the winglet 120 may be defined relative to an angle of incidence of the wing portion 110.

In the example shown in FIG. 4, the angle of incidence $\theta$ of the winglet 120 in the extended position Z (and therefore the angle of incidence of the distal end 112 of the wing portion 110) is substantially zero. In many examples, the angle of incidence of the wing 11, wing portion 110 and the winglet 120 in the extended position Z, is non-zero. In some examples, the wing 11 and/or the wing portion 110 comprises twist, in which an angle of incidence of the wing 11 and/or the wing portion 110 changes along a span of the wing 11 and/or the wing portion 110. In any case, deflection of the winglet 120 so as to change the angle of incidence $\theta$ of the winglet 120 causes a change in an effective twist of the wing system 100 comprising the wing portion 110 and the winglet 120, and/or of the wing 11 comprising the wing system 100. That is, increasing and decreasing a level deflection of the winglet 120 increases and decreases an effective twist of the wing 11 and or the wing system 100 of the aircraft 1. This, in turn, causes a change in a distribution of lift over the wing 11 and/or the wing system 100.

In some examples, changing a distribution of lift over the wing 11 and/or the wing system 100 by deflecting the winglet 120 causes a change in a centre of lift 14 of the aircraft 1. For instance, as the wings 11 of the aircraft 1 are swept backwards, lift generated by the winglet 120 acts at a rearward end of the wing 11 and/or wing portion 110, while lift generated the wing 11 or wing portion 110 closer to the fuselage 10 acts at a forward end of the wing 11. As such, a decrease in an amount of lift generated at the winglet, such as by deflecting the winglet 120 upwards to decrease the angle of incidence $\theta$ of the winglet 120, and therefore an angle of attack of the winglet 120 relative to a free stream air flow over the winglet 120, may act to move the centre of lift 14 forward. To the contrary, an increase in an amount of lift generated by the winglet 120, such as by deflecting the winglet 120 downwards to increase the angle of incidence $\theta$, and therefore angle of attack, of the winglet 120, may act to move the centre of lift 14 rearwardly. Moreover, adjusting the position of the winglet 120 may adjust a level of lift-induced drag (or "induced drag") of the wing system 100 and/or the wing 11. For instance, deflecting the winglet 120 upwards may reduce a level of aerodynamic drag associated with wing tip vortices, and thereby change a lift distribution over the wing, which could also affect the centre of lift 14. This may, in turn affect an attitude of the aircraft 1, such as a pitch of the aircraft 1. In other words, an attitude of the aircraft 1. In other words, an attitude of the aircraft 1 may be controlled by controlling a position of the winglet 120.

It will be appreciated that increasing the toe angle η of the axis of rotation 123 of the winglet 120 would increase a change in the angle of incidence θ of the winglet 120 for a given deflection of the winglet 120. This would, in turn, increase an amount of effective twist imparted to the wing 11 and/or wing system 100 for the given deflection of the winglet 120. It will also be appreciated that increasing a size, such as a span and/or area, of the winglet 120 relative to the wing 11 and/or the wing portion 110 would increase an amount of effective twist imparted by a given deflection of the winglet 120. Thus, increasing the toe angle η and/or the size of the winglet 120 may increase an authority of the winglet 120 over the lift distribution over the wing 11 and/or wing system 100, and as such may increase an authority of the winglet 120 over the attitude of the aircraft 1. In the present example, when the winglet 120 is in the extended position Z, a span of the winglet 120 makes up around 25% of a total span of the wing 11; however, it will be appreciated that the winglet 120 may be of any other suitable size.

As shown in FIG. 5, the winglet 120 is movable to a stowed position S, in which the winglet 120 is substantially vertical, such that a span of the winglet 120 is substantially parallel to the vertical axis 16. In the stowed position S, a total wingspan of the wing system 100 and/or the aircraft 1 is reduced. The reduction in span may be most significant when the winglet 120 has a larger span. For instance, when the winglet 120 has a span that constitutes 25% of a span of the wing 11 when the winglet 120 is in the extended position Z, a length of the wing 11 may be reduced by up to 25% by moving the winglet 120 to the stowed position S. This can allow the wings 11 of the aircraft 1 to have a large aspect ratio when the winglet 120 is deployed, such as when the winglet is in the extended position Z or a deflected position A, B, while still allowing the aircraft 1 to perform ground manoeuvres at smaller airports having restricted space. A larger aspect ratio may reduce a drag of the aircraft 1 when in flight. Moreover, larger wings may allow more lift to be generated at lower speeds, thereby reducing a landing distance of the aircraft 1 and permitting the aircraft 1 to land and/or take-off on smaller runways.

In the present example, the winglet 120 comprises a controller 150 configured to perform a method 700 of controlling an attitude of the aircraft 1. The method 700 is shown schematically in FIG. 7. The controller 150 may be located in any suitable location on the aircraft 1. The controller 150 is configured to obtain 720 information representative of an attitude of the aircraft 1, in particular during a flight of the aircraft 1. The controller 150 is configured to control 740 the attitude of the aircraft 1, on the basis of the information, by actively controlling 741 a position of the winglet 120. As discussed above, actively controlling 741 the position of the winglet 120 is to control an angle of incidence of the winglet 120, which in turn can vary a lift distribution over the wing 11 of the aircraft 1, and thereby control the attitude of the aircraft 1.

In order to actively control 740 the attitude of the aircraft, the wing system 100 comprises an actuator 125 configured to position the winglet 120 in any position within a range of movement of the winglet 120 around the axis of rotation 123. The actuator 125 here comprises an electric actuator, specifically an electric motor. It will, however, be appreciated that any other suitable actuator 125 may be used. For instance, the actuator 125 may comprise a hydraulic actuator, or an electromechanical actuator, such as a hydraulically or electrically operated piston. The controller 150 is configured to control the actuator 125 to control the position of the winglet 120.

The aircraft 1 also comprises a sensor system 160, which in this example is a part of the wing system 100, comprising sensors configured to sense the information representative of the attitude of the aircraft 1. That is, in the present example, the controller 150 is configured to obtain 720 the information based on data received from the sensory system 160. In other examples, the controller 150 is configured to obtain 720 some or all of the information from one or more other sensors and/or controllers of the aircraft 1 and/or the wing system 100. The information obtained by the controller 150, in various examples, comprises information on any one or more of the following properties: a pitch of the aircraft 1; an angle of attack of the aircraft 1; a speed of the aircraft 1; a drag of the aircraft 1; a mass of the aircraft 1; a distribution of mass in the aircraft 1; a centre of gravity 13 of the aircraft 1; an amount of fuel in the aircraft 1; a fuel consumption of the aircraft 1; and an efficiency of the aircraft 1, such as an efficiency of one or more engines of the aircraft 1. It will be appreciated that the above listed properties may be sensed and/or determined in any suitable way. For instance, the sensory system 160 may comprise a fuel flow sensor, and/or a fuel level detector for detecting a fuel consumption of the aircraft 1. Alternatively, or in addition, the sensory system 160 may comprise an attitude sensor, such as a gyroscope or any other suitable sensor, for detecting the attitude, such as the pitch of the aircraft, and/or a speed sensor for determining a speed of the aircraft 1.

The controller 150 of the present example is configured to determine 720 a target attitude of the aircraft 1, specifically a target pitch of the aircraft 1. The controller 150 is then configured to control 740 the pitch of the aircraft 1, specifically by controlling 741 the position of the winglet 120, to bring the pitch of the aircraft 1 towards the target pitch of the aircraft 1. The target pitch of the aircraft 1 in this example is a pitch of the aircraft at which a level of drag produced by the fuselage 10 is at a minimum. In other words, the target pitch of the aircraft 1 is such that the longitudinal axis 15 of the aircraft is aligned with the direction of travel of the aircraft 1. In other examples, the target pitch is any other suitable pitch, such as a pitch at which any of the above-listed properties approaches, or reaches, a respective target value, or a theoretical pitch at which a property (such as fuel consumption, efficiency, and/or drag of the aircraft) is improved or optimised. In other examples, the controller 150 is configured to control 740 the attitude of the aircraft 1 so as to influence or control one or more of the properties listed above, such as to bring one or more of the above listed properties towards a respective target value. For instance, the controller 150 may be configured to control 740 the attitude, such as the pitch, of the aircraft 1 to facilitate maintenance of a target fuel consumption, target efficiency, and/or a target drag of the aircraft 1.

The controller 150 in the present example is configured to control 740 the attitude of the aircraft 1 in particular during a cruise phase of a flight of the aircraft 1. This can improve an efficiency of the aircraft 1 as fuel is consumed and the attitude of the aircraft 1 changes throughout the cruise phase, for example without, or in addition to, using a fuel ballast system to control a centre of gravity 13 of the aircraft 1. In some examples, the controller 150 is alternatively, or in addition, configured to control 740 the attitude of the aircraft 1 during a take-off and/or a landing procedure of the aircraft 1. Alternatively, the controller 150 may control the position of the winglet 120 during a take-off and/or landing procedure, such as to reduce a separation of airflow over the winglet 120 and thereby improve a lift generated by the wing system 100. This may allow the aircraft 1 to take-off and/or land at slower speeds and/or have a reduced landing and/or take-off distance than may otherwise be possible. This may allow the aircraft 1 to land at airports having shorter runways than would otherwise be possible. The controller 150 is configured to move 740 the winglet 120 to the stowed position S, such as after a flight when the aircraft 1 is performing ground manoeuvres. The controller 150 is also configured to move 750 the winglet 120 from the stowed position S to the extended position Z and/or any suitable deflected position A, B, such as before a flight of the aircraft 1.

Turning now to FIG. 6, the wing system 100 of the present example comprises a restrictor 600 that is operable to restrict a range of movement of the winglet 120 relative to the wing portion 110. The restrictor 600 comprises a body 610 that is fixed to the wing portion 110, and a slot 620 within which a portion of the winglet 120, which is here a protrusion 630 of the winglet 120, is configured to move. The slot 620 as a fixed dimension, which is here an arc, along which the protrusion 630 can move as the position of the winglet 120 is controlled or varied, thereby restricting a range of movement of the winglet 120. The restrictor 600 is releasable from the protrusion 630 to disengage the restrictor 600. This is here by the body 610 being movable relative to the winglet 120 and the protrusion 630, specifically by the body 610 being rotatable about a pivot axis 650 to disengage the protrusion 630 from the slot 620. In other examples, the protrusion 630 is movable relative to the body 610 and/or the slot 620 to disengage the protrusion 630 from the slot 620. It will be appreciated that the restrictor 600 shown and described with reference to FIG. 6 is merely an illustrative example, and the restrictor 600 may be configured to restrict a range of movement of the winglet 120 in any other suitable way. For instance, in other examples, a length of the slot 620 may be variable so as to vary a level of restriction of movement of the winglet 120 provided by the restrictor 600.

The restrictor 600 is operable by the controller 150. Specifically, the controller 150 is configured to selectively engage 715 or disengage 745 the restrictor 600. The restrictor 600 in FIG. 6 is shown in an engaged configuration, in which the slot 620 is engaged with the protrusion 630 of the winglet 120. The winglet 120 is shown in two different positions at opposing extremes of the range of movement permitted by the restrictor 600. As noted above, in the engaged configuration, the range of movement of the winglet 120 is restricted by a length of an arc formed by the slot 620. In this case, the range of movement of the winglet 120 is restricted to a rotation of 10° above and below the extended position Z of the winglet 120, but in other examples may be any other suitable range, such as up to 5°, up to 10°, up to 15°, up to 20°, up to 25°, up to 30°, or greater than 30° from the extended position Z, in one or both directions. The restrictor 600 may be disengaged, such as by moving the body 610 comprising the slot 620 relative to the wing portion 110 and the protrusion 630, as described above.

When the winglet 120 is in the stowed position S before a flight, the controller is in the present example configured to move 710 the winglet 120 from the stowed position S, such as to the extended position Z and/or any suitable deflected position A, B. The controller 150 is additionally configured to engage 715 the restrictor 600 before and/or during a flight of the aircraft 1, such as to permit the position of the winglet 120 to be varied within a restricted range during the flight. The flight may include a take-off and landing procedure of the aircraft 1, as well as a cruise phase of the aircraft 1. The controller 150 is also configured to disengage 745 the restrictor 600 when the aircraft 1 is on the ground, such as after a flight when the aircraft 1 is performing ground manoeuvres and/or when the aircraft 1 is in proximity to a boarding terminal of an airport. In this way, the controller 150 is able to move 750 the winglet 120 to the stowed position S described above when the aircraft 1 is on the ground. Although not shown here, the restrictor 600 may comprise a mechanism for locking the winglet 120 in the stowed position S, such as a pin, biasing means, or any other suitable mechanism. Alternatively, or in addition, the wing system 100 may comprise a lock, other than the restrictor 600, for holding the winglet 120 in the stowed position S. In some such examples, the controller 150 is configured to selectively engage and disengage the lock and/or the mechanism of the restrictor 600 to respectively hold the winglet 120 in the stowed position S and release the winglet from the stowed position S.

FIG. 8 shows a schematic diagram of a non-transitory computer-readable storage medium 800 according to an example. The non-transitory computer-readable storage medium 800 stores instructions 830 that, if executed by a processor 820 of a controller 810, cause the processor 820 to perform a method according to an example. In some examples, the controller 810 is the controller 150 as described above. The instructions 830 comprise: obtaining 631 information representative of the attitude of the aircraft 1; and, on the basis of the information, controlling the attitude of the aircraft 1 by controlling a position of the winglet 120 relative to the wing portion 110, thereby to control an angle of incidence of the winglet 120. In other examples, the instructions 330 comprise instructions to perform any other example methods described herein, such as the method 700 described above with reference to FIG. 7.

It will be understood that the wing system 100, controller 150, aircraft 1, method 700 and non-transitory computer-readable storage medium 800 described above are illustrative examples only. Variations and/or modifications can be made within the scope of the invention as defined by the appended claims. For instance, some examples may not comprise the restrictor 600. In other examples, the winglet 120 may not be movable to the stowed position S, or the winglet 120 may be movable above the extended position Z to a different extent than the winglet 120 is movable below the extended position Z. Other variations and modifications will be foreseeable to the skilled person.

It is to be noted that the term "or" as used herein is to be interpreted to mean "and/or", unless expressly stated otherwise.

The invention claimed is:

1. An aircraft attitude controller configured to:
   obtain information on any one or more of the following properties:
   a mass of the aircraft,
   a distribution of mass of the aircraft,
   a centre of gravity of the aircraft,
   an amount of fuel in the aircraft, and
   a fuel consumption of the aircraft; and,
   on the basis of the information, control an attitude of the aircraft by actively controlling a position of a winglet at a distal end of a wing portion of a wing of the aircraft, relative to the wing portion, thereby to control an angle of incidence of the winglet;

wherein the aircraft attitude controller is configured to determine a target attitude of the aircraft; and, wherein the controlling the attitude of the aircraft comprises controlling the attitude of the aircraft to bring the attitude of the aircraft towards the target attitude of the aircraft.

2. The aircraft attitude controller of claim 1, wherein the attitude of the aircraft comprises a pitch of the aircraft and/or an angle of attack of the aircraft.

3. The aircraft attitude controller of claim 1, wherein the information comprises information on any one or more of the following properties:

a pitch of the aircraft;

an angle of attack of the aircraft;

a speed of the aircraft;

a drag of the aircraft; and an efficiency of the aircraft.

4. A wing system for an aircraft, the wing system comprising at least a wing portion of a wing, a winglet at a distal end of the wing portion, and a controller, wherein a position of the winglet relative to the wing portion is variable to change an angle of incidence of the winglet, and wherein the controller is configured to:

obtain information on any one or more of the following properties:

a mass of the aircraft, a distribution of mass of the aircraft, a centre of gravity of the aircraft, an amount of fuel in the aircraft, and a fuel consumption of the aircraft, and, on the basis of the information, control the attitude of the aircraft by actively controlling the position of the winglet relative to the wing portion;

wherein the controller is configured to determine a target attitude of the aircraft, and wherein the controlling the attitude of the aircraft comprises controlling the attitude of the aircraft to bring the attitude of the aircraft towards the target attitude of the aircraft.

5. The wing system of claim 4, wherein the winglet is rotatably movable relative to the wing portion.

6. The wing system of claim 5, wherein an axis of rotation of the winglet relative to the wing portion is orientated at a non-zero toe angle to a vertical plane that includes a longitudinal axis of the aircraft.

7. The wing system of claim 4, comprising a restrictor operable to restrict a range of movement of the winglet.

8. The wing system of claim 4, wherein the winglet is movable to an extended position, in which a proximal end of the winglet is substantially aligned with the distal end of the wing portion, and wherein a span of the winglet, when the winglet is in the extended position, constitutes from 10% to 50% of the total span of the wing comprising the wing portion.

9. The wing system of claim 4, comprising an actuator for varying the position of the winglet relative to the wing portion.

10. The wing system of claim 4, wherein the attitude controller is configured to:

obtain information representative of an attitude of an aircraft; and, on the basis of the information, control the attitude of the aircraft by actively controlling a position of a winglet at a distal end of a wing portion of a wing of the aircraft, relative to the wing portion, thereby to control an angle of incidence of the winglet.

11. A method of controlling an attitude of an aircraft, the method comprising:

obtaining information on any one or more of the following properties:

a mass of the aircraft, a distribution of mass of the aircraft, a centre of gravity of the aircraft, an amount of fuel in the aircraft, and a fuel consumption of the aircraft; and, on the basis of the information, controlling the attitude of the aircraft by controlling a position of a winglet at a distal end of a wing portion of a wing of the aircraft, relative to the wing portion, thereby to control an angle of incidence of the winglet;

wherein the method comprises determining a target attitude of the aircraft, and wherein the controlling the attitude of the aircraft comprises controlling the attitude of the aircraft to bring the attitude of the aircraft towards the target attitude of the aircraft.

12. The method of claim 11, comprising determining a target attitude of the aircraft, wherein the controlling the attitude of the aircraft comprises controlling the attitude of the aircraft to bring the attitude of the aircraft towards the target attitude of the aircraft.

13. A non-transitory computer-readable storage medium storing instructions that, when executed by a processor, cause the processor to perform the method of claim 11.

14. An aircraft comprising the aircraft altitude controller of claim 1.

15. An aircraft comprising the wing system of claim 4.

16. An aircraft comprising the non-transitory computer-readable storage medium of claim 13.

* * * * *